Aug. 7, 1951 F. N. DICKERMAN 2,563,518
TAIL WHEEL INSTALLATION
Filed Jan. 3, 1946 2 Sheets-Sheet 2

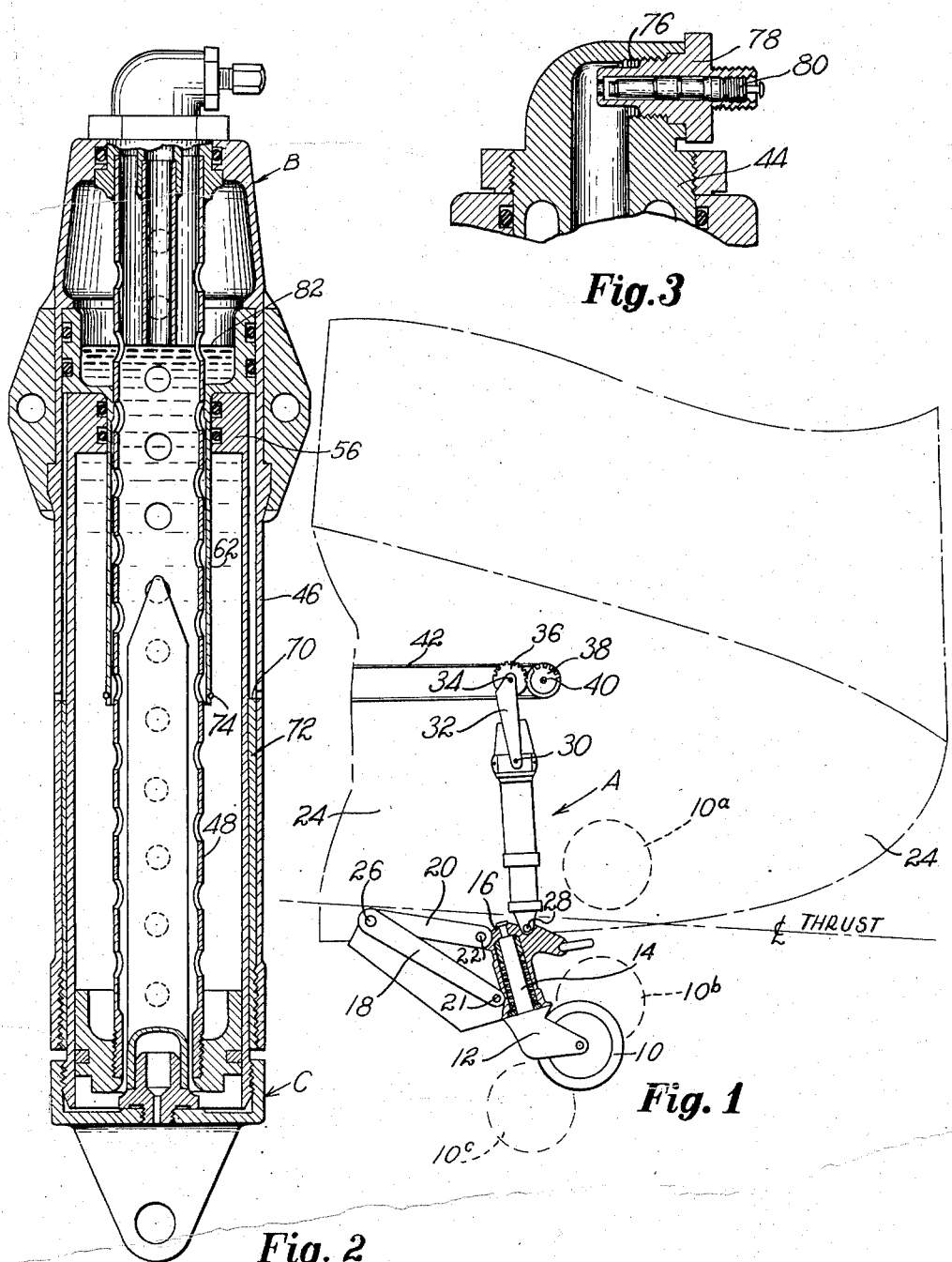

INVENTOR.
Fred N. Dickerman
BY M. B. Tasker
ATTORNEY

Patented Aug. 7, 1951

2,563,518

UNITED STATES PATENT OFFICE 2,563,518

TAIL WHEEL INSTALLATION

Fred N. Dickerman, Nichols, Conn., assignor to United Aircraft Corporation, East Hartford, Conn., a corporation of Delaware Application January 3, 1946, Serial No. 638,853

5 Claims. (Cl. 267—64)

This invention relates to landing gear for aircraft, and is particularly concerned with tail wheel and nose wheel landing gear units of the oleo pneumatic type in which the wheel has a castering action.

It is an object of the invention to provide an improved oleo strut for tail and nose wheel installations of this type having means for preventing the extension of the wheel under static load beyond a position where it has favorable castering characteristics.

Another object of the invention is to provide an improved oleo strut for a landing gear having means for reducing the effective area of its piston before the oleo strut has become extended to the point where undesirable castering effects appear.

A further object is generally to improve the construction and operation of airplane nose and tail wheel assemblies.

These and other objects and advantages of the invention will become evident from the following description of a preferred form of the invention shown in the accompanying drawings.

In these drawings,

Fig. 1 is a typical airplane tail wheel installation illustrating the invention;

Fig. 2 is an enlarged longitudinal sectional view of the oleo strut of Fig. 1 showing the strut fully compressed;

Fig. 3 is a still more enlarged sectional view showing the upper end of the strut in further detail;

Figure 4:
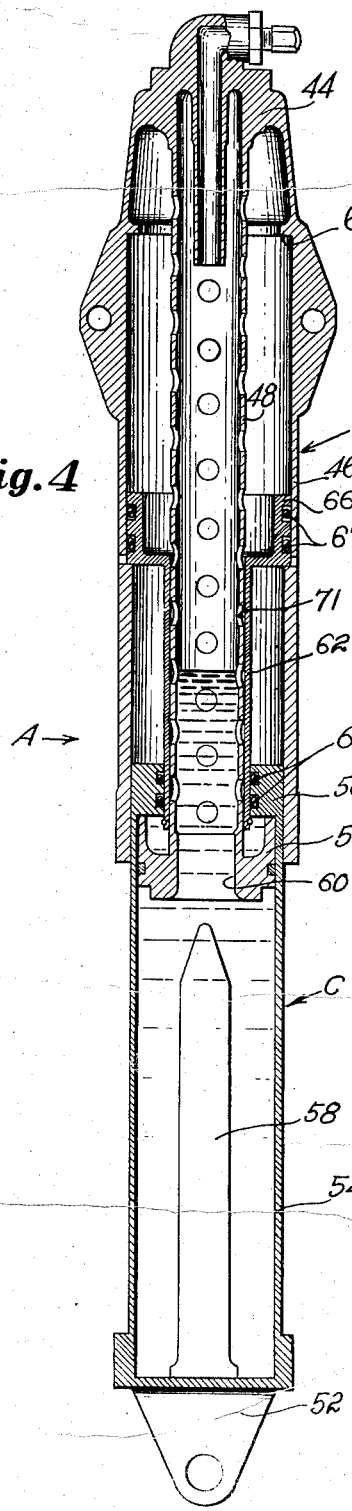
Fig. 4 is a view similar to Fig. 2 showing the oleo strut fully extended as would be the case when the airplane is approaching for a landing.

As herein shown, a tail wheel 10 is rotatably mounted in a wheel fork 12 having a shank 14 swivelled in a wheel housing 16 which comprises one link in a tail wheel operating linkage. The linkage further includes two short drag link struts 18 and 20 pivoted to the housing 16 at vertically spaced points 21 and 22 and pivoted at their opposite ends to a fixed part of the airplane fuselage 24 at a common point 26. The housing 16 is further pivotally connected at 28 to one of the telescoping elements of an oleo pneumatic strut generally indicated as A, the other element of which is pivotally connected at 30 to a depending operating arm 32 on a shaft 34. The shaft 34 carries a sector gear 36 which meshes with a similar gear 38 on a parallel operating shaft 40. The shaft 40 carries a pulley which is driven by an actuating belt 42 to move the arm 32 through an angle which approaches 180° from the position shown to swing the tail wheel linkage upwardly into a retracted position within the fuslage 24. In this retracted position the tail wheel 10 occupies the dotted position 10a shown in Fig. 1.

The tail wheel assembly is shown in full lines in Fig. 1 in the static position, i. e. in the position which it occupies when the airplane is on the ground. In this position the oleo strut A acts as a shock absorber and is movable between a fully compressed position and a fully extended position corresponding to the positions 10b and 10c, respectively, of the wheel 10. When the airplane leaves the ground the oleo strut extends by gravity into its fully extended position in which the tail wheel 10 occupies the position 10c from which it is moved into its retracted position by the pilot.

An undesirable castering characteristic occurs in an airplane tail or nose wheel particularly when, as is frequently necessary, its operating linkage is constructed with short drag link struts, such as the struts 18 and 20, in an effort to confine the installation to a limited space. In such an installation, the included angle between the ground and the drag linkage is large, a condition which results in relatively large changes in caster angle of the spindle of the wheel yoke with accompanying changes in extension of the oleo strut.

When an airplane equipped with a tail wheel assembly, as illustrated, is pushed backward on the ground, and the tail wheel yoke 12 swivels so that the wheel 10 trails toward the forward end of the airplane, the load on the oleo strut A is greatly reduced, owing to the change in ratio of the moment arms of the load on the wheel and the load in the strut about the pivot point 26 for the assembly. Since the extension of the oleo is proportional to the load on it, the oleo immediately extends farther and thereby further reduces the load acting on it. The result is that when the airplane is pushed backward the oleo strut extends until it reaches the limit of its extension in which the wheel 10 occupies the position 10c of Fig. 1.

Thereupon, two undesirable conditions exist. First, as the airplane is rolled backward over even the least obstruction a tension load is imposed on the oleo and no shock absorber is provided for the airplane structure; secondly, the tail wheel spindle has reached such a large negative caster angle that it becomes extremely difficult to move the tail end of the airplane either sideways or forward, as the tail wheel strongly resists castering in the directions.

Figure 5:
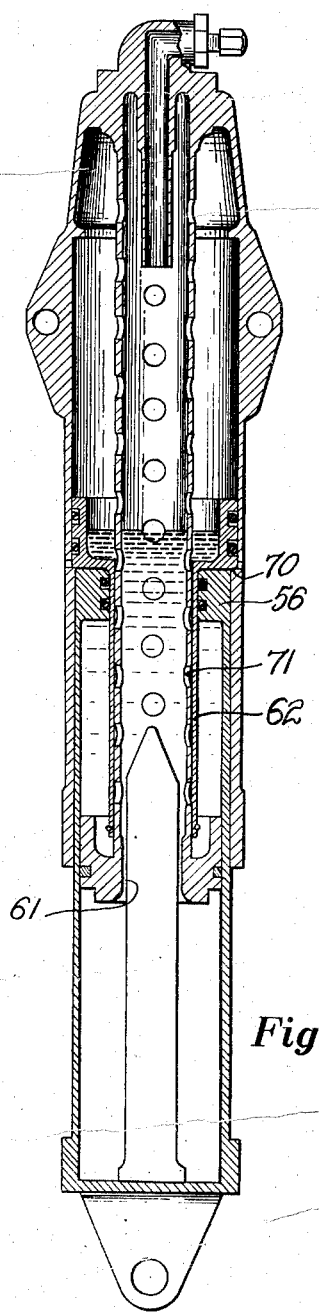
Fig. 5 is a view similar to Figs. 2 and 4 showing the position of the oleo strut under static load.

These difficulties are successfully overcome by the improved oleo strut of the present invention. As shown in Figs. 2, 4 and 5, the oleo strut A comprises an upper cylinder element B and a lower telescoping piston element C, each of which has an end fitting by which it is connected to the other elements of the tail wheel linkage. The upper element B includes the end fitting 44 constituting the support for the upper end of the outer concentric oleo cylinder 46 and the inner perforated tube 48. The latter carries an annular member 50 at its lower end which closes the space between tube 48 and a cylinder 54 of piston element C. The lower piston element C includes the end fitting 52 which carries cylinder 54 within which the member 50 has a working fit, and carries at its upper end an annular piston 56. The lower fitting also carries an imperforate axial metering pin 58 which extends through an imperforate portion 60 of tube 48 and provides an annular metering passage 61 (Fig. 5) between this lower imperforate end portion of tube 48 and the pin 58.

A floating member is also provided in the oleo strut which cooperates with both telescoping elements B and C. This floating member includes a cylindrical tube 62 which lies within the inner periphery of piston 56 of the cylinder 54, the piston 56 having a sealed running fit on the external diameter of this intermediate tube 62, suitable packing 64 being provided to effect a fluid tight seal at this point. The tube 62 also carries a piston 66 at its upper end having packing rings 67 which make a fluid tight sliding fit with the outer cylinder 46 of the upper oleo element B. The piston 66 is limited in its upward movement by an annular shoulder 68 on the outer cylinder 46 and is limited in its downward movement by a shoulder 70, best shown in Fig. 2, which is formed by an inner cylindrical tube 72 screw-threaded into the lower end portion of outer cylinder 46. A stop ring 74 is provided on the external surface of tube 62 at its lower end which prevents upward displacement of the floating member in the extended position of the strut in the event that the cylinder has not been filled with fluid.

The fitting 44 which is shown in detail in Fig. 3 has a filling port 76 through which oil or other hydraulic fluid is introduced into the cylinder. This port is closed by a screwthreaded plug 78 which carries an air inlet valve 80. With the strut in the position shown in Fig. 2, in which it is fully compressed, it is filled with hydraulic fluid up to the level 82. The plug 78 is then screwed into the port 76 and air is admitted through valve 80 until the strut assumes the position shown in Fig. 5 when the airplane is on the ground, in which the strut is in its static position corresponding to the full line position of wheel 10 in Fig. 1. It will be noted that in this position the freely floating piston 66 is bottomed on stop 70. The only effective area on the lower oleo element now being acted upon toward the further extension of the strut is an area equal to the internal cross sectional area of tube 62, i. e. the area of the aperture 71 in the member 62, and the total force applied against this area by the fluid pressure in the oleo is not sufficient to extend the strut under its static load farther than the Fig. 5 position.

When the airplane is approaching for a landing, however, with its tail wheel down, the strut under the force of gravity is extended into the Fig. 4 position in which the piston 56 is bottomed against the member 50. As the airplane lands, the strut is compressed at a rate determined by the flow of oil past the metering pin 58 through the passage 61.

The airplane taxies on the ground with the strut in the position shown in Fig. 5 with the piston 56 abutting the under surface of the freely floating piston 66. The strut during its remaining travel into the fully compressed position of Fig. 2 acts as a shock absorber, although an extremely heavy load would have to be encountered to compress it into the position shown in Fig. 2, since in the Fig. 5 position the entire area of the freely floating piston 66 is acted upon by the air pressure to resist further compression of the strut.

It will be evident that as a result of this improved construction an oleo strut has been provided for an airplane tail or nose wheel installation having means for preventing the extension of the strut under static load beyond a position where the wheel has favorable castering characteristics. Also, the usual bumping and bouncing of a taxiing airplane, due to a too fully extended oleo strut on the tail wheel has been eliminated. It will be noted that these improvements in castering characteristics are provided without decrease in the amount of air pressure applied to the strut; and hence without decrease in shock absorbing properties of the tail wheel supporting mechanism in landing.

In addition a compact self-contained strut has been provided, i. e. a strut which is not dependent upon the atmosphere or outside sources of pressure.

While only a single embodiment of the invention has been described and illustrated herein, as representing the preferred embodiment, it is to be understood that various changes may be made in the construction and arrangement of the elements as herein illustrated without departing from the scope of the invention as defined by the appended claims.

What is claimed as new is:

1. A shock absorbing oleo strut having a cylinder element comprising an outer cylinder adapted to contain a compressible fluid, a piston element cooperating with said cylinder element having an annular apertured piston, a floating assembly comprising a telescoping tube extending through the aperture in said piston having an open lower end and an annular apertured piston at its upper end which cooperates with said cylinder, and stop means on the inner wall of said cylinder for arresting said assembly in a partially extended position of said strut.

2. A shock absorbing oleo strut having a cylinder assembly comprising spaced inner and outer tubular members forming concentric annular chambers, a cooperating dual piston mechanism in said outer chamber comprising a piston and a tubular member telescoping therewith and carrying a second piston at its free end, said second piston having an area comprising a substantial part of the cross sectional area of said outer chamber, and fixed stop means in said outer chamber for engaging said second piston at an intermediate point in the extending movement of said strut.

3. A shock absorbing oleo strut having a cylinder assembly comprising inner and outer tubular members forming concentric annular chambers, said inner tubular member having means providing fluid communication between said chambers, a cooperating dual piston mechanism in said outer chamber comprising a first piston and a telescoping element incorporating a second piston at its free end, said second piston having an area comprising a substantial part of the cross sectional area of said outer chamber, and stop means on a wall of said outer tubular chamber for engaging said telescoping element at an intermediate point in the extending movement of said strut while permitting further extension of said first piston beyond the arrested position of said telescoping element.

4. A shock absorbing oleo strut having a cylinder assembly comprising inner and outer tubular members forming concentric annular chambers, said inner tubular member having a metering orifice at its lower end and having means providing fluid communication between said chambers, a cooperating dual piston mechanism forming a closure for the open end of said chambers including a metering pin reciprocable into and out of said metering orifice and first and second pistons reciprocable in said outer chamber, said first piston having a fluid tight sliding fit on the inner surface of said outer tubular member and having a concentric tube depending in said outer chamber, and said second piston having a fluid tight sliding fit on the outer surface of said depending tube, and abutment means on said outer tubular member for limiting the extending movement of said first piston.

5. In a shock absorbing device, two relatively movable telescoping assemblies adapted to be connected to the elements whose movements are to be cushioned, the first of said assemblies comprising a cylinder and a concentric perforated tube rigidly mounted therein and forming two concentric chambers, said tube having a passage at its lower end for passing fluid therethrough, the second of said assemblies including a concentric metering pin adapted to cooperate with said passage in said tube, a concentric axially apertured piston movable with said pin, and a floating piston reciprocable within the outer chamber of the first assembly having a telescoping connection with said first mentioned piston including a depending tubular extension extended through said piston aperture.

FRED N. DICKERMAN.

REFERENCES CITED

The following references are of record in the file of this patent:

UNITED STATES PATENTS

| Number | Name | Date |
| --- | --- | --- |
| 1,289,728 | Giles | Dec. 31, 1918 |
| 1,474,222 | Akers et al. | Nov. 13, 1923 |
| 1,819,414 | Gruss | Aug. 18, 1931 |
| 1,991,212 | Herrmann | Feb. 12, 1935 |
| 2,008,094 | Chester | July 16, 1935 |
| 2,174,312 | Cleveland | Sept. 26, 1939 |
| 2,197,474 | Johnson | Apr. 16, 1940 |